United States Patent [19]

Hunter et al.

[11] Patent Number: 4,777,188

[45] Date of Patent: Oct. 11, 1988

[54] PROCESS FOR PRODUCING FOAMED ELASTOMERIC COMPOSITIONS

[75] Inventors: Byron A. Hunter, Alpine; Lee D. Hansen, Orem, both of Utah; Donald G. Rowland, Woodbridge, Conn.

[73] Assignee: Uniroyal Chemical Company, Inc., Middlebury, Conn.

[21] Appl. No.: 948,219

[22] Filed: Dec. 31, 1986

[51] Int. Cl.$^4$ .............................................. C08J 9/10
[52] U.S. Cl. ....................................... 521/93; 521/79; 521/94; 521/909
[58] Field of Search ...................... 521/909, 93, 94, 79

[56] References Cited

U.S. PATENT DOCUMENTS

| 3,846,350 | 11/1974 | Schentger . |
| 4,312,776 | 1/1982 | Puri et al. . |
| 4,438,223 | 3/1984 | Hunter . |
| 4,444,679 | 4/1984 | Rowland et al. . |
| 4,472,536 | 9/1984 | Rowland et al. . |
| 4,482,650 | 11/1984 | Rowland et al. . |
| 4,554,294 | 11/1985 | Hunter et al. . |

FOREIGN PATENT DOCUMENTS

| 2148099 | 4/1973 | Fed. Rep. of Germany . |
| 145876 | 7/1978 | Japan . |
| 133433 | 10/1980 | Japan . |
| 1567417 | 5/1980 | United Kingdom . |

OTHER PUBLICATIONS

"Celogen-AZ" by Barnhart, Compounding Research Report #38, Naugatuck Chemical, U.S. Rubber Co, pp. 1-13.

Dollimore et al, *J. of Inorganic Nuclear Chemistry*, 29, 621-627 (1967).

Djega-Mariadassou et al, *Bull. Soc. Chim, France*, 9, pp. 3166-3173 (1971).

Primary Examiner—Morton Foelak
Attorney, Agent, or Firm—William E. Dickheiser

[57] ABSTRACT

Foamed elastomeric compositions are produced by a process comprising the steps of (A) forming a blend comprised of (1) a foamable, curable elastomer; (2) a curative; and (3) a blowing agent composition consisting essentially of (i) azodicarbonamide and (ii) at least one member selected from the group consisting of zinc salt of $C_1$–$C_6$ organic acids and $C_1$–$C_6$ carboxamides; and (B) heating such blend to between about 130° C. and about 170° C. for a period of time sufficient to foam and cure such blend.

7 Claims, No Drawings

PROCESS FOR PRODUCING FOAMED ELASTOMERIC COMPOSITIONS

FIELD OF THE INVENTION

This invention relates to a process for producing a foamed elastomeric composition, which process comprises the steps of (A) forming a blend comprised of (1) a foamable, curable elastomer; (2) a curative; and (3) a blowing agent composition consisting essentially of (i) azodicarbonamide and (ii) at least one member selected from the group consisting of zinc salts of $C_1$–$C_6$ organic acids and $C_1$–$C_6$ carboxamides; and (B) heating such blend to between about 130° C. and about 170° C. for a period of time sufficient to foam and cure such blend. In another aspect, this invention relates to the foamed elastomeric composition produced by the practice of the process of this invention.

BACKGROUND OF THE INVENTION

In the manufacture of foamed elastomeric compositions, a foamable, curable elastomeric polymer is conventionally mixed with a curative and a blowing agent which, upon exposure to elevated temperature conditions, decomposes to form gaseous decomposition products for expansion of the material. Such processes for preparing foamed elastomeric compositions (wherein the temperature of the blend is gradually raised so that foaming and curing will occur) vary greatly from processes for preparing foamed resinous or thermoplastic compositions, as such thermoplastic processes typically involve heating the resin above its softening temperature, blending in blowing agent, and letting the blend temperature gradually cool while blowing is occuring. Thus, due to such processing differences, it is not evident that a blowing agent composition suitable for thermoplastic resins would also be desirably employed for expanding elastomeric materials and visa versa.

Among conventionally employed blowing agents, azodicarbonamide has come into widespread usage as this blowing agent is non-toxic, odorless and non-flammable in character, and its decomposition products present no dangerous health hazards. However, azodicarbonamide has the disadvantage that its decomposition temperature is relatively high, 210° C., rendering it difficult to use with many polymeric materials—particularly those which are susceptible to thermal degradation or deterioration at such relatively high temperatures. Consequently, when used with polymeric materials having such disadvantageous thermal characteristics, it is desirable to add a decomposition accelerator (activator) to lower the decomposition temperature of the azodicarbonamide blowing agent.

Although a large number of such activators for lowering the decomposition temperature of azodicarbonamide have been disclosed, the performance requirements of blowing agents have now become more and more critical and changes in the composition of the blowing agents can have significant effects on the end product.

Among the activators for azodicarbonamide which have been disclosed in the past are various zinc salts, which are most typically employed in conjunction with a third component.

Thus, Japanese Patent Publication No. 1978-145876 of Shimagana et al describes a foamed thermoplastic vinyl chloride composition which is produced employing a blowing agent comprising azodicarbonamide and one or more zinc salts of organic carboxylic acids having at most six carbon atoms. It is noteworthy that the compositions actually exemplified by this patent all additionally contain barium stearate which, although nominally employed as a heat stabilizer, will have considerable effect upon the activation of the azodicarbonamide. Accordingly, the compositions of Japanese Publication No. 1978-145876 are processed at up to 180° C., and are expanded at 200° C.

Somewhat similarly, Japanese Patent Publication No. 1980-133433 to Tomimoto et al discloses a blowing agent composition comprised of (i) azodicarbonamide; and (ii) the reaction product of an amine with a zinc compound. A broad range of zinc compounds (including zinc chloride, zinc bromide, zinc iodide, zinc sulfate, zinc sulfite, zinc carbonate, zinc nitrate, zinc formate, and zinc acetate) and of amines (including ammonia, hydrazine, hydroxylamine, methylamine, ethylamine, isopropylamine, n-butylamine, n-hexylamine, n-dodecylamine, n-octadecylamine, ethylenediamine, propylenediamine, hexamethylenediamine, monoethanolamine, aniline, guanidine, and aminoguanidine) which may be co-reacted is disclosed. However, it is to be noted that Tomimoto et al indicate that if one simply adds a mixture of unreacted zinc compound and amine to azodicarbonamide, the full desired effect of the invention cannot be realized.

In addition, U.S. Pat. Nos. 4,444,679 and 4,472,536 and 4,482,650, all to Rowland et al, described three-component blowing agents comprised of (i) azodicarbonamide; (ii) zinc oxide, zinc carbonate or a zinc salt of a $C_1$–$C_4$ organic acid; and (iii) an aromatic sulfinic acid or a metal salt of an aromatic sulfinic acid.

Other activators for azodicarbonamide are disclosed in U.S. Pat. No. 4,312,776 to Puri et al (which shows a blowing agent composition comprised of (i) azodicarbonamide; (ii) a chromium sulfate; and (iii) a zinc salt or oxide); in U.S. Pat. No. 3,846,350 to Schentger (which shows the expansion of polychloroprene employing a blowing agent composition comprised of azodicarbonamide and at least one metal oxide); and in U.S. Pat. No. 4,554,294 to Hunter et al (which shows blowing agents comprised of a mixture of azodicarbonamide and the zinc salt of nitro-urea).

It has also been disclosed in the past that, for certain applications, zinc formate may function as a desirable blowing agent. Thus, British Pat. No. 1,567,417 shows foamed thermoplastic compositions which are produced by heating a blend of polyester and zinc formate to the 280° C. decomposition temperature of zinc formate (in the sole Example, a Wood's metal bath heated to 240° C. is employed). Similarly, German Offenlegungsschrift No. 2,148,099 describes the expansion of thermoplastic polymers using neutral metal salts of formic and/or oxalic acid optionally with a stabilizer such as sodium phosphite, while U.S. Pat. No. 4,438,223 (to Hunter) describes a blowing agent composition comprised of (a) zinc formate; and (b) certain sodium or potassium salts. Similarly, Dollimore et al in *Journal Of Inorganic Nuclear Chemistry*, 29, 621–627 (1967) describe the decomposition behavior of zinc and manganous formates while Djega-Mariadassou et al in *Bull. Soc. Chim. France*, 9, 3166–3173 (1971), "Study of Decompositions Causing Simultaneous Release of Several Gases, IV—Thermal Decomposition Of Zinc Formate Dihydrate and Morphology of Zinc Oxide Residual"

detail the decomposition behavior of zinc formate and the role of zinc oxide formed during its decomposition.

While the various blowing agent compositions described above are suitable for certain uses, there are nevertheless restrictions imposed upon the use of all blowing agents which arise from the processing limitations of the polymers to be expanded. Thus, a polymer with a degradation temperature of 200° C. could not be expanded using a blowing agent with an activation temperature of 250° C. Consequently, there is a need for new processes to expand certain polymers which may have relatively narrow preferred processing temperatures and conditions.

Accordingly, it is an object of this invention to provide a process for expanding elastomeric materials having a processing temperature of between about 130° C. and about 170° C.

It is another object of this invention to provide a novel expanded elastomeric composition.

These objects and other additional objects will become more fully apparent from the following description and accompanying Example.

DESCRIPTION OF THE INVENTION

In one aspect, this invention relates to a process for producing a foamed elastomeric composition comprising the steps:
(A) forming a blend comprised of:
 (1) a foamable, curable elastomer;
 (2) a curative; and
 (3) a blowing agent composition consisting essentially of:
  (i) azodicarbonamide; and
  (ii) at least one member selected from the group consisting of zinc salts of $C_1$-$C_6$ organic acids and $C_1$-$C_6$ carboxamides; and
(B) heating such blend to between about 130° C. and about 170° C. for a period of time sufficient to foam and cure said blend.

In another aspect, this invention relates to the foamed elastomeric composition produced by the practice of the process of this invention.

The blowing agent employed in the practice of this invention consists essentially of (i) azodicarbonamide and (ii) at least one member selected from the group consisting of zinc salts of $C_1$-$C_6$ organic acids and $C_1$-$C_6$ carboxamides.

Suitable zinc salts useful as component (ii) of such blowing agent composition include zinc salts of $C_1$-$C_6$ organic acids such as carboxylic acids. The straight chain carboxylic acids, e.g., formic acid, acetic acid, propionic acid, n-butyric acid, n-valeric acid and n-hexanoic acid, as well as mixtures thereof, are particularly advantageous in the practice of the present invention.

Among the aforementioned straight-chain carboxylic acids, the preferred $C_1$-$C_6$ organic acid for the zinc salt is formic acid, whereby the zinc salt is zinc formate. Such zinc salt may be provided in the blowing agent composition in the form of anhydrous zinc formate or as zinc formate dihydrate, or as mixtures thereof.

Additionally or alternately, component (ii) of the blowing agent composition of this invention may comprise a $C_1$-$C_6$ carboxamide. As used herein, the term "$C_1$-$C_6$ carboxamide" refers to a compound of the structure R—CON(R$_1$)$_2$ wherein each of the R and R$_1$ substituents may vary independently of the others and are hydrogen or a $C_1$-$C_6$ linear or branched alkyl radical. A particularly advantageous carboxamide useful in the practice of the present invention is formamide, although other carboxamides such as acetamide, butanamide and N-methylpropanamide and N,N-dimethylbutanamide may also be employed to good effect.

Moreover, mixtures of zinc salts of $C_1$-$C_6$ organic acids and/or of $C_1$-$C_6$ carboxamides may be employed as component (ii). In the preferred blowing agent compositions of the present invention, constituent (ii) is either zinc formate or formamide.

It is to be understood that the zinc salts employed herein may be hydrated or anhydrous. Thus, for example, as is employed herein, the term "zinc formate" is intended to be broadly construed so as to encompass all forms of zinc formate whether or not combined, complexed or otherwise associated with water, such term including both anhydrous zinc formate as well as zinc formate dihydrate, as well as mixtures of such forms of the compound.

The efficacy of the zinc formate-containing blowing agent compositions of this invention is particularly surprising when one considers that zinc formate itself is a blowing agent with a decomposition temperature of about 288° C. It is completely unexpected that one could combine two high temperature blowing agents (i.e. azodicarbonamide which decomposes at 210° C. and zinc formate which decomposes at 288° C.) and produce a blowing composition with an effective processing temperature of between about 130° and about 170° C..

Although the azodicarbonamide constituent of the blowing agent composition employed in the process of this invention may be used in any form suitable for combination with the other components of the composition, it is generally preferable to use such material in a particulate form. When used in such form, the particle size of the azodicarbonamide may be varied according to the given end-use application and specific performance and product characteristics desired. In general however, the mean particle diameter of the azodicarbonamide component is typically of the order of between about 0.5 and about 50 microns, and is preferably between about 2 and about 20 microns.

The specific concentrations and relative proportions of (i) azodicarbonamide and (ii) zinc salt of a $C_1$-$C_6$ organic and/or $C_1$-$C_6$ carboxamide in the blowing agent compositions used in the process of the invention may be varied widely, depending upon the particular response time (i.e., time between exposure to the elevated temperature condition used, and the initial evolution of gas from the composition), gas evolution rate and gas quantity desired. One skilled in the art may, however, easily determine by routine experimentation the preferred proportions for a given expandable material and/or end use.

Preferably, for many applications, the blowing agent composition comprises sufficient amounts of (ii) zinc salt of $C_1$-$C_6$ organic acid and/or a $C_1$-$C_6$ organic carboxamide, relative to the amount of (i) azodicarbonamide, such that the resulting blowing agent composition evolves at least 150 cm$_3$ gas/gram of azodicarbonamide within 15 minutes when heated to 150° C. Such decomposition reaction gas production rate is suitably determined by the procedure of the following test (hereinafter referred to as the "gas evolution test").

In the gas evolution test, which provides a means of evaluating various azodicarbonamide activating systems over a range of temperatures or at a set temperature, the blowing agent composition is first prepared by thoroughly mixing its constituents in a blender. To a measured amount of the resulting composition, dioctyl phthalate is added at a rate of 25 ml per 1 gram of composition. The mixture is placed in a gas evolution measuring device, in which the non-condensable gas released during exposure of the blowing agent composition to elevated temperature is collected and measured and the measured volume corrected to standard temperature and pressure conditions (STP).

In general, the blowing agents employed in the process of this invention contain between about 0.5 and about 50% by weight, more preferably between about 1 and about 40% by weight, of zinc salt and/or carboxamide, based on the weight of azodicarbonamide present in the composition.

The foamable, curable elastomers which are employed in the process of this invention may be highly unsaturated rubbers, saturated rubbers, or blends thereof. Any elastomer which is processable at the temperatures of the process of this invention may be employed. Particularly preferred elastomers are styrene-butadiene rubber, butadiene, neoprene, EPDM, silicone rubbers, nitrile rubber and natural rubber.

As is employed herein, the term "curative" encompasses both curatives and curing systems. As is well known to those skilled in the art, the particular curatives which may be employed in a given composition are generally governed by the availability of unsaturation and/or functional groups present in the foamable, curable polymers to be cured. Any curative which is effective to cure the particular elastomer or elastomers employed at the reaction temperatures of the process of this invention (i.e., of between about 130° C. and about 170° C.) may be employed. Thus, in certain circumstances, sulfur and/or sulfur donors and/or (hydro)-peroxides may be utilized.

The curatives of the process of this invention are present in an amount effective to cure the polymer of such composition. Typically, such curatives will be present in amounts of between about 0.5 and about 5 parts by weight per 100 parts of polymer.

The blowing agent compositions employed in the practice of this invention may further comprise additional suitable materials useful for the foaming operation or to achieve performance or structural properties for the product in its desired end-use application. Such additional optional components include catalysts, surfactants, activators (such as urea), extenders, antioxidants, stabilizers, fungicides, bacteriostats, UV absorbers and the like.

In general, the amount of blowing agent composition used with the foamable and curable elastomer may vary widely depending on the previously mentioned factors, as may be determined without undue experimentation by one of ordinary skill in the art. In general, blowing agent composition concentrations of between about 0.05 and about 20% by weight, with most preferred concentrations typically being between about 1 and about 10% by weight, based on the total weight of the foamable polymer, are employed.

The blend employed in the process of this invention is produced by mixing the ingredients described above employing suitable mixers, such as homogenizers, dispersers, Banbury (Trademark) and sigma blade mixers. Mixing may be done at room temperature or elevated temperature so long as such temperature is below the foaming and curing temperature of the composition.

Preferably, all the ingredients except the blowing agent are first blended together until an essentially homogeneous composition is obtained, it being understood that the mixing temperature not reach the activation temperature of the curative. Thereafter, the blowing agent may be blended in while taking care that the mixing temperature remains well under the decomposition or gasification temperature of the blowing agent.

The blend is then formed into the desirable configuration, e.g., by extrusion, and is heated to between about 130° C. and about 170° C., preferably to between about 140° C. and about 165° C., thereby producing the foamed and cured composition of this invention. These foamed and cured compositions are suitable for a variety of purposes, including shoe soles and the like.

EXAMPLES

The following Examples are intended to further illustrate the invention and are not intended to limit the scope of the invention in any manner whatsoever.

EXAMPLES 1-5

In order to show the efficacy of the blowing agent compositions employed in the process of this invention, several blends comprising 2 parts of azodicarbonamide and 1 part of the zinc salt listed in Table I were prepared by thoroughly mixing such components in an internal blender. Into each blend was mulled dioctyl phthalate in amounts of 25 ml per 1 gram of composition. A sample comprising 0.3 gram of active material so prepared was placed in a gas evolution measuring device. The noncondensable gas released was collected, measured and the volume corrected to standard conditions. The result of such testing is summarized in Table I.

TABLE I

| Example | 1 | 2 | 3 | 4 | 5 |
|---|---|---|---|---|---|
| Azodicarbonamide (parts) | 2 | 2 | 2 | 2 | 2 |
| Zinc formate (parts) | 1 | — | — | — | — |
| Zinc acetate (parts) | — | 1 | — | — | — |
| Zinc propionate (parts) | — | — | 1 | — | — |
| Zinc n-butyrate (parts) | — | — | — | 1 | — |
| Zinc n-valerate (parts) | — | — | — | — | 1 |
| Decomposition temp, °C.* | 153 | 158 | 162 | 152 | 157 |
| Gas evolved, cm$^3$/g | 200.5 | 156.2 | 153.1 | 163.5 | 168.7 |

*The temperature above which almost instantaneous decomposition occured. Decomposition below this temperature occurs at a slower rate.

The above data indicate that desirable quantities of gas are evolved by the two-component blowing agent employed in the process of this invention at unexpectedly low temperatures.

EXAMPLES 6-13 and Comparative Experiments A-C

Employing a process essentially identical to that described above, several blends of azodicarbonamide and zinc formate dihydrate were evaluated for their gas evolution at 150°-158° C. As a comparison, the gas evolved at this temperature was determined for azodicarbonamide alone (Comparative Experiment A); zinc formate bonamide dihydrate alone (Comparative Experiment B); and for dinitrosopentamethylenetetramine (DNPT), a commercially empolyed blowing agent. The results of such evaluation are summarized in Table II.

TABLE II

| | Example or Comparative Experiment | | | | | | | | | | |
|---|---|---|---|---|---|---|---|---|---|---|---|
| | A | B | C | 6 | 7 | 8 | 9 | 10 | 11 | 12 | 13 |
| ADC, Parts | 100 | — | — | 95 | 90 | 80 | 75 | 70 | 60 | 50 | 40 |
| Zinc Formate Dihydrate, Parts | — | 100 | — | 5 | 10 | 20 | 25 | 30 | 40 | 50 | 60 |
| DNPT, Parts | — | — | 100 | — | — | — | — | — | — | — | — |
| Total Gas Evolved at 150–158° C., cm³/g of Composition | | | | | | | | | | | |
| | 2 | 35 | 96 | 180 | 196 | 214 | 214 | 203 | 190 | 177 | 156 |
| Total Gas Evolved at 150–158° C., cm³/g of Azodicarbonamide | | | | | | | | | | | |
| | 2 | 35 | 96 | 189 | 218 | 268 | 285 | 290 | 317 | 354 | 390 |

The above data demonstrate the unexpectedly high amount of gas generated by the blowing agent compositions employed in the process of this invention at the process temperatures of this invention.

EXAMPLES 14 and 15 and Comparative Experiment D

In the following Examples and Comparative Experiment, the ingredients utilized in various compositions are identified with reference to the designations shown in Tables III and IV below.

SBR-1: Styrene-Butadiene (24.5% bound styrene) Synpol 1502, Synpol, Inc.
SBR-2: Styrene-Butadiene (58.0% bound styrene) Polysar SS255, Polysar Limited.
Extender Oil: Naphthenic Oil, ASTM D2226, Type 103 (Circoso [TM] 4240).
Carbowax: Polyethylene glycols (Carbowax 4000) Union Carbide Corporation
Resin: Aromatic resin (Picco 100) Hercules, Inc.
Antioxidant-1: Octylated diphenylamine (Octamine [TM] Uniroyal, Inc.
Accelerator-1: N-cyclohexy-2-benzothiazole sulfenamide (Delac-S [TM]) Uniroyal, Inc.
Filler-1: Hydrated Silica (Hi-Sil 233) PPG Industries, Inc.
Filler-2: Clay, sp. gr. 2.6; particle size: ca. 95% less than 2 micron (Suprex Clay [TM] J. M. Huber Corp.)
DPG MB-352 (0.65): Diphenylguanadine MB-65% T(DPG) D65, Wyrough and Loser, Inc.
Urea MB (0.75): Urea masterbatch 75% active BIK-OT [TM] R-464, Ware Chemical Corp.
ADC: Azodicarbonamide; av. particle size: 3 micron (Celogen [TM] AZ130) Uniroyal, Inc.
DNPT: Dinitrosopentamethylene tetramine Opex 93, Olin Employing the below listed ingredients, a rubber masterbatch was prepared by mixing in a Banbury [TM].

TABLE III

| Masterbatch-1 | Parts by Weight |
|---|---|
| SBR-1 | 70 |
| SBR-2 | 60 |
| Filler-1 | 30 |
| Filler-2 | 100 |
| Resin | 10 |
| Antioxidant-1 | 2 |
| Stearic Acid | 1 |
| Zinc Oxide | 5 |
| Extender Oil | 10 |
| Total Parts | 288 |

Compositions produced employing the process of the invention (Examples 14 and 15) were evaluated for the expansion of press molded cellular shoe soling while simultaneously curing the polymeric material, versus a composition produced using a process comprising a conventional blowing agent, dinitrosopentamethylene tetramine.

In Comparative Experiment D, the blowing agent was DNPT. In Examples 14 and 15, the blowing agent comprised 67 parts ADC and 33 parts zinc formate. The blowing agent of Example 14 was prepared as follows:

A slight (circa 5%) excess of zinc oxide was added to a solution of commercial formic acid (88% concentration) in an appropriate amount of water. The resulting crystalline suspension of zinc formate was heated to 80° C. to bring the salt completely into solution. The proper amount of azodicarbonamide was then added to the clear water white solution with stirring. Stirring was continued while gradually cooling the mixture. Zinc formate was uniformly deposited on the particles of azodicarbonamide. The well-cooled suspension was then filtered, dried and powdered. Care was taken to avoid overheating the blend during the drying operation.

The blowing agent of Example 15 was prepared by dry blending the components in a ball mill.

The compositions and results for these Samples are set forth in Table IV below.

TABLE IV

| | Cellular Shoe Soling | | |
|---|---|---|---|
| Example or Comparative Experiment | D | 14 | 15 |
| Masterbatch-1 | 288.00 | 288.00 | 288.00 |
| Carbowax | 1.00 | 1.00 | 1.00 |
| Urea MB (.75) | 4.00 | 1.33 | 1.33 |
| Accelerator-1 | 0.80 | 0.80 | 0.80 |
| DPG MB (.75) | 0.45 | 0.45 | 0.45 |
| Sulfur | 2.50 | 2.50 | 2.50 |
| Blowing Agent | 5.00 | 5.00 | 5.00 |
| Total | 301.75 | 299.08 | 299.08 |
| Cured (10 minutes at 163° C.) Density, g/cm² | 0.48 | 0.43 | 0.37 |

The above data indicate that the process of this invention will produce blown elastomeric compositions which are particularly suitable for use in shoe soles.

What is claimed is:

1. A process for producing a foamed elastomeric composition comprising the steps:
   (A) forming a blend comprised of:
   (1) a foamable, curable elastomer;
   (2) a curative; and
   (3) a blowing agent composition consisting essentially of:
      (i) azodicarbonamide; and
      (ii) zinc formate; and
   (B) heating such blend to between about 130° C. and about 170° C. for a period of time sufficient to foam and cure said blend.

2. The process of claim 1 wherein component (ii) is present in an amount of between about 0.5 and about 50 percent by weight, based upon the weight of component (i).

3. The process of claim 2 wherein component (ii) is present in an amount of between about 1 and about 40 percent by weight, based upon the weight of component (i).

4. The process of claim 1 wherein component (3) is present in an amount of between about 0.05 and about 20 percent by weight, based upon the weight of component (1).

5. The process of claim 4 wherein component (3) is present in an amount of between about 1 and about 10 percent by weight, based upon the weight of component (1).

6. The process of claim 1 wherein the blend is heated to between about 140° and 165° C. in step (B).

7. A foamed elastomeric composition produced in accordance with the process of claim 1.

* * * * *